United States Patent
Balasundaram et al.

(10) Patent No.: US 9,928,159 B2
(45) Date of Patent: Mar. 27, 2018

(54) SYSTEM AND METHOD TO SELECT A PACKET FORMAT BASED ON A NUMBER OF EXECUTED THREADS

(71) Applicant: Qualcomm Incorporated, San Diego, CA (US)

(72) Inventors: Prasanna Kumar Balasundaram, San Diego, CA (US); Suresh K. Venkumahanti, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 817 days.

(21) Appl. No.: 13/776,947

(22) Filed: Feb. 26, 2013

(65) Prior Publication Data

US 2014/0244986 A1     Aug. 28, 2014

(51) Int. Cl.
| | | |
|---|---|---|
| G06F 15/00 | (2006.01) | |
| G06F 7/38 | (2006.01) | |
| G06F 9/00 | (2006.01) | |
| G06F 9/44 | (2006.01) | |
| G06F 11/36 | (2006.01) | |

(52) U.S. Cl.
CPC ...... *G06F 11/3656* (2013.01); *G06F 11/3636* (2013.01)

(58) Field of Classification Search
None
See application file for complete search history.

(56) References Cited

U.S. PATENT DOCUMENTS

| | | | |
|---|---|---|---|
| 6,681,384 B1* | 1/2004 | Bates | G06F 9/52 |
| | | | 714/35 |
| 8,284,846 B2 | 10/2012 | Lamy-Bergot | |
| 2003/0061019 A1 | 3/2003 | Swoboda | |
| 2005/0108689 A1* | 5/2005 | Hooper | G06F 11/3664 |
| | | | 717/135 |
| 2005/0207490 A1 | 9/2005 | Wang | |
| 2006/0200823 A1 | 9/2006 | Rodeheffer et al. | |
| 2008/0115115 A1 | 5/2008 | Codrescu et al. | |
| 2008/0165860 A1 | 7/2008 | Sahraoui et al. | |
| 2008/0256396 A1 | 10/2008 | Giannini et al. | |
| 2010/0299668 A1* | 11/2010 | Venkumahanti | G06F 11/3632 |
| | | | 718/102 |
| 2012/0213286 A1 | 8/2012 | Wu et al. | |
| 2012/0269275 A1 | 10/2012 | Hannuksela | |
| 2013/0007720 A1* | 1/2013 | Cai | G06F 11/3664 |
| | | | 717/130 |

OTHER PUBLICATIONS

International Search Report and Written Opinion of the International Searching Authority for International Application No. PCT/US2014/016016, dated May 16, 2014, 11 pages.

* cited by examiner

*Primary Examiner* — George Giroux
(74) *Attorney, Agent, or Firm* — Qualcomm Incorporated-Toler

(57) ABSTRACT

A system and method to select a packet format based on a number of executed threads is disclosed. In a particular embodiment, a method includes determining, at a multi-threaded processor, a number of threads of a plurality of threads executing during a time period. A packet format is determined from a plurality of formats based at least in part on the determined number of threads. Data associated with execution of an instruction by a particular thread is stored in accordance with the selected format in a memory (e.g., a buffer).

31 Claims, 7 Drawing Sheets

SYSTEM AND METHOD TO SELECT A PACKET FORMAT BASED ON A NUMBER OF EXECUTED THREADS

I. FIELD

The present disclosure is generally related to a system and method to select a packet format based on a number of executed threads.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

During debugging of a processor, such as a processor in a portable wireless telephone, it is often useful to record information related to the processor's runtime behavior. For example, a buffer may store information that results from execution of instructions by the processor, and the stored information may be accessed by a debug tool. In addition, with processor architecture advancements, such as multi-threaded processors, the bandwidth requirements to communicate the execution behavior of such processors have increased.

III. SUMMARY

Systems and methods of generating packets that can be used to facilitate debugging of a multi-threaded processor are disclosed. In a multi-threaded processor, a debugging system may rely on the threads being executed by the multi-threaded processor in a particular sequence. For instance, threads may be executed in a round robin fashion and debuggers (e.g., an external debug tool) rely on the particular sequence of thread execution when reconstructing an instruction sequence from information received from the multi-threaded processor. The information may be received by the debugger in one or more packets. Each packet may include data (e.g., data representing runtime behavior of a thread on a multi-threaded processor) that is compressed and/or encoded according to a packet format. The packet format(s) may define a method to compress/encode data so that the debugger is able to understand the runtime behavior of the multi-threaded processor.

However, some processors may execute a variable number of threads during a given time period. An example of this approach is a processor with a Dynamic Multi Thread (DMT) Architecture. In one disclosed embodiment, debugging information for a DMT processor is provided by generating packets that have a format that is selected based on a number of threads that are executed during a particular time period. For example, a packet in a first packet format may be generated when only one thread is executing during a time period or when a non-cycle accurate mode is enabled. A packet in a second packet format may be generated when a number of commit operations, stall cycles, or any combination thereof is greater than or equal to a threshold during a time period. During cycle accurate mode, a packet in a third packet format may be generated when more than one thread is executing during the time period or when a number of stall cycles by a particular thread is one or more and is less than the threshold. A "commit operation" may be an operation that includes a thread executing a line of instructions or may occur when a thread determines not to jump during execution of a conditional jump instruction and proceeds to the next line of instructions. Generated packets (each having a particular selected format) are stored by the processor in a buffer. A debug tool may retrieve the packets from the buffer. The debug tool may perform debug operations, such as reconstructing the instruction execution sequence for the multi-threaded processor for each thread.

In one embodiment, the packets contain information that indicates whether an instruction was executed by a thread. An action taken by a thread in a given cycle, or data associated with the action, may be referred to as an atom. Actions taken by a thread in multiple consecutive cycles, or data associated with the actions, may be referred to as an atom sequence. Atom sequences may be encoded and stored in a packet.

In a DMT architecture, the number of threads that executed during any given time period may not be known beforehand. For example, the order and number of cycles (e.g., execute cycles, wait cycles, etc.) may not be fixed or predetermined. The packet formats described herein may enable compact representation of data generated by a DMT processor.

In a particular embodiment, a method includes determining, at a multi-threaded processor, a number of threads of a plurality of threads executing during a time period. A packet format is determined from a plurality of formats based at least in part on the determined number of threads. Data associated with execution of an instruction by a particular thread is stored in accordance with the selected format in a memory (e.g., a buffer).

In another particular embodiment, an apparatus includes an encoder configured to encode data related to execution of a plurality of threads. The data is encoded in a format that is based on a number of the plurality of threads executed during a time period. The apparatus further includes a memory configured to store the data encoded by the encoder. The data stored by the memory is accessible to a debugger in connection with a debug operation.

In another particular embodiment, a non-transitory computer-readable storage medium stores instructions executable by a computer system. In response to executing the instructions stored by the computer-readable storage medium, a multi-threaded processor determines a number of threads executing during a time period. A multi-threaded processor determines a format from a plurality of formats based at least in part on the determined number of threads. Data associated with execution of an instruction by a particular thread is stored in accordance with the selected format in a buffer.

In another particular embodiment, an apparatus includes means for encoding data related to execution of a plurality of threads. The data is encoded in a format that is based on a number of the plurality of threads executed during a time period. The apparatus further includes means for storing the data encoded by the means for encoding. The data stored by the means for storing is accessible to a debug tool in connection with a debug operation.

One particular advantage provided by at least one of the disclosed embodiments is the ability to reconstruct information related to instructions executed by multiple threads running on a multi-threaded processor, where the threads are dynamically scheduled (e.g., a DMT processor).

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
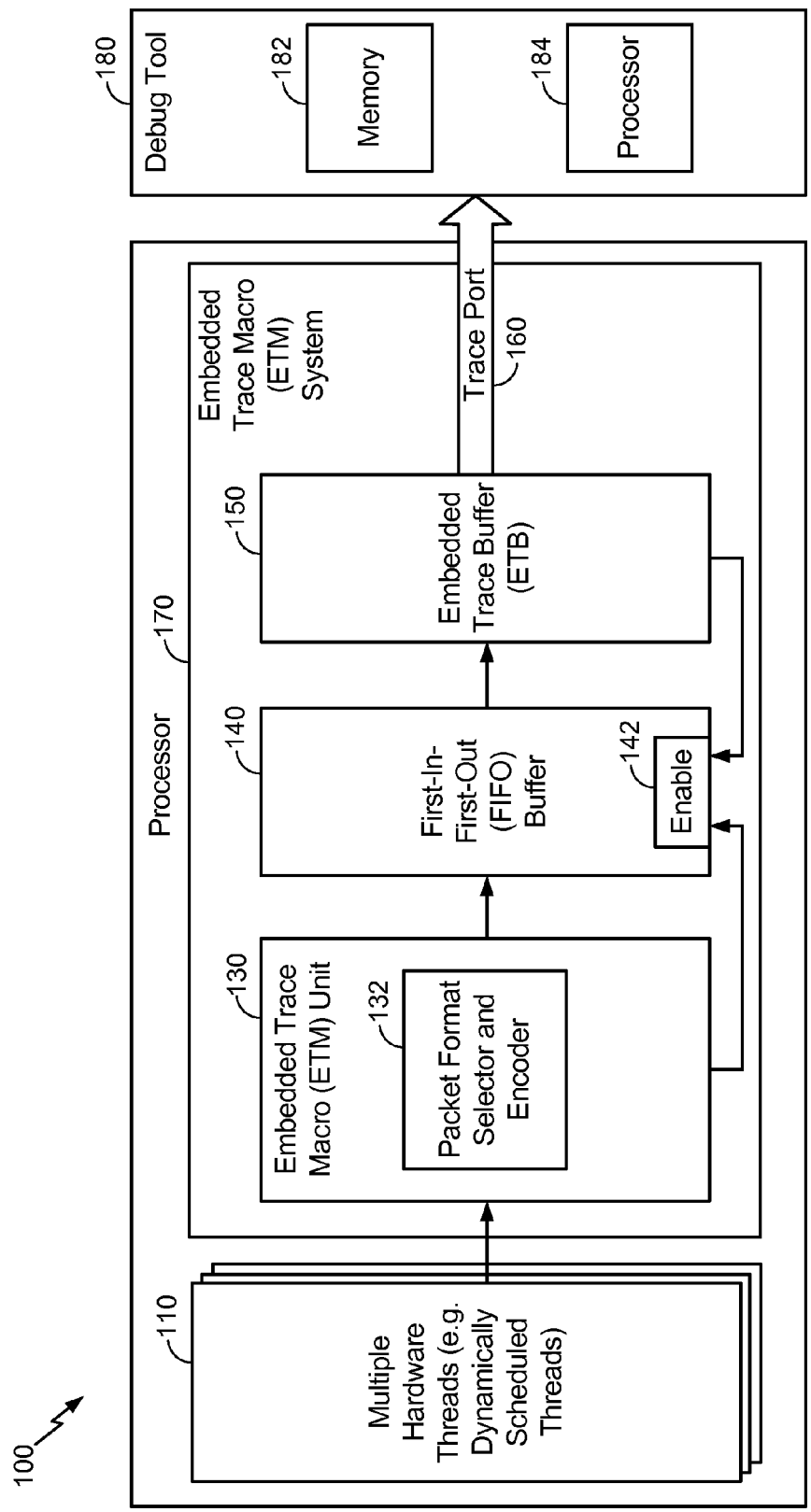
FIG. 1 is a block diagram of a particular illustrative embodiment of a processor that includes an embedded trace macro system.

FIG. 1 is a block diagram of a processor 100 that includes an embedded trace macro system 170. In a particular embodiment, the processor 100 is a multi-threaded processor and may be an interleaved multi-threaded processor or a dynamic multi-threaded processor. A dynamic multi-threaded processor schedules threads for execution in a non-fixed (e.g., non-round robin) fashion. For example, scheduling may be based on which threads are available or which threads have processes running, as opposed to assigning an equal share of processor resources to all threads. In an illustrative embodiment, the embedded trace macro system 170 receives data from multiple software threads executing on multiple hardware threads 110 (e.g., dynamically scheduled hardware threads). An embedded trace macro (ETM) unit 130 includes a packet format selector and encoder module 132 that collects and encodes execution data received from the separate hardware threads 110 into packets. The ETM unit 130 is coupled to a FIFO buffer 140 in which the packet data is stored until the packet data is passed to an embedded trace buffer (ETB) 150 that outputs the packet data via a trace port 160. The packet data output via the trace port 160 is received by a debug tool 180, where the packet data is used to debug software threads executing on the multiple hardware threads 110.

According to a particular embodiment, one of or both of the ETM unit 130 and the ETB 150 are configured to control an enable input 142 on the FIFO buffer 140 to control the transmission of the packets from the FIFO buffer 140 to the ETB 150. The ETM unit 130 may be configured to cause the FIFO buffer 140 to communicate the packet data via the ETB 150 to prevent overflow of the FIFO buffer 140. Also, the ETB 150 may be configured to cause the FIFO buffer 140 to output packet data when the ETB 150 determines that the ETB 150 is able to communicate packet data via the trace port 160. The ETB 150 may be integrated into the processor 100.

The packet format selector and encoder module 132 within the ETM unit 130 may include logic to encode execution data into a format selected from a plurality of available formats. The multiple hardware threads 110 may be scheduled dynamically in accordance with a dynamic multithread architecture. The packet format selector and encoder module 132 may include logic that determines, at the multi-threaded processor 100, a number of threads executing during a time period by determining an atom sequence that occurred since a previous packet was encoded. An atom sequence may include or represent actions taken by a thread of a processor in multiple cycles or data associated with such actions.

As used herein, a "time period" may correspond to one or more processor cycles for which debug data is represented in an atom sequence of a packet. A packet may include multiple atom sequences, and may correspond to multiple time periods that are collectively referred to herein as a "time frame." For example, a thread may generate a first packet at cycle 5, where the first packet includes a first atom sequence for cycles 0-3 and a second atom sequence for cycles 4-5. The thread may then generate a second packet at cycle 8 including an atom sequence for cycles 6-8. Thus, the time frame of the first packet may be cycles 0-5, and the time periods of the atom sequences in the first packet may be cycles 0-3 and 4-5 respectively. The time frame for the second packet may be cycles 6-8, and the time period for the atom sequence of the second packet may also be cycles 6-8.

The packet format selector and encoder module 132 may determine a format from a plurality of formats based at least in part on the determined number of threads. Once the format has been selected, the packet format selector and encoder module 132 may store data in a memory, such as the first-in-first-out buffer 140, in accordance with the selected format. In a particular embodiment, the data stored in the FIFO buffer 140 is associated with execution of a particular thread during the time period. The data stored in the FIFO buffer 140 may be debug data, as further described herein.

During operation, data corresponding to execution of instructions of a plurality of threads is stored in an encoded format at the FIFO buffer 140. For example, the packet format selector and encoder module 132 monitors and encodes data in a particular packet format and sends packets in the particular packet format to be stored in the FIFO buffer 140. Periodically, or upon a particular event, data from the FIFO buffer 140 is transmitted to the embedded trace buffer 150. Thereafter, data in the embedded trace buffer 150 may be communicated via the trace port 160 to an external debug tool 180. The external debug tool 180 includes a processor 184 and a memory 182. Data from the embedded trace buffer 150 may be stored in the external memory 182 and processed by the processor 184. For example, the debug tool 180 may include software to perform visualizations and debugging operations in order for a developer to evaluate performance and/or to test performance of the processor 100. The debugging operations may include reconstructing the instruction execution sequence for single or multiple threads based on data stored in the external memory 182. For example, a user may use the debug tool 180 to determine which hardware thread executed each particular instruction. Thus, the processor 100 may be a device under test and the debug tool 180 may include software that is executable to perform various tests and debug activities thereon.

The FIFO buffer 140 may store data corresponding to one or more of the multiple hardware threads 110. For example, the FIFO buffer 140 may store data resulting from or corresponding to execution of all of the multiple hardware threads 110 of the processor 100. For example, the embedded trace macro unit 130, including the packet format selector and encoder module 132, monitors the multiple hardware threads 110 and encodes various packets and communicates those packets for each of the plurality of threads to the FIFO buffer 140. Thus, the FIFO buffer 140 stores data corresponding to execution of each thread of the multiple hardware threads 110. In a dynamic multi-threading architecture, the particular format used for encoding the packets at the embedded trace macro unit 130 is determined dynamically based at least in part on the number of threads executing during a particular time period. With a dynamic multi-threading architecture, the number of threads executed by the processor is variable depending on load and execution. For example, in a particular phase of operation, a single thread may be executed while in other phases of operation, the processor may execute two or more threads concurrently or in an interleaved manner. Thus, the number of threads executing during any particular time period varies. In order for the embedded trace macro unit 130 to generate data to accommodate a variable number of threads executing during any particular time period, a plurality of different encoding formats for generating debug packets may be used. For example, one encoding format may be used when a thread is the only thread running during a time period. Another encoding format may be used when multiple threads are running during a time period. A different format may be used when a thread does not execute for a time period. Examples of packet formats are further described with reference to FIGS. 3 and 4. Examples of time periods are illustrated with reference to FIG. 5.

The packet format selector and encoder module 132 asynchronously sends encoded data packets to the FIFO buffer 140. In a particular embodiment, the timing that triggers sending an encoded data packet from the embedded trace macro unit 130 to the FIFO buffer 140 is determined based on the particular format used. Depending on whether a single thread or multiple threads are executed by the processor during a time period, the packet format selector and encoder module 132 may trigger communication of an encoded packet at various times. Further details regarding a particular state machine that implements logic within the packet format selector and encoder module 132 to perform packet generation is described in further detail with respect to FIG. 4.

Figure 2:
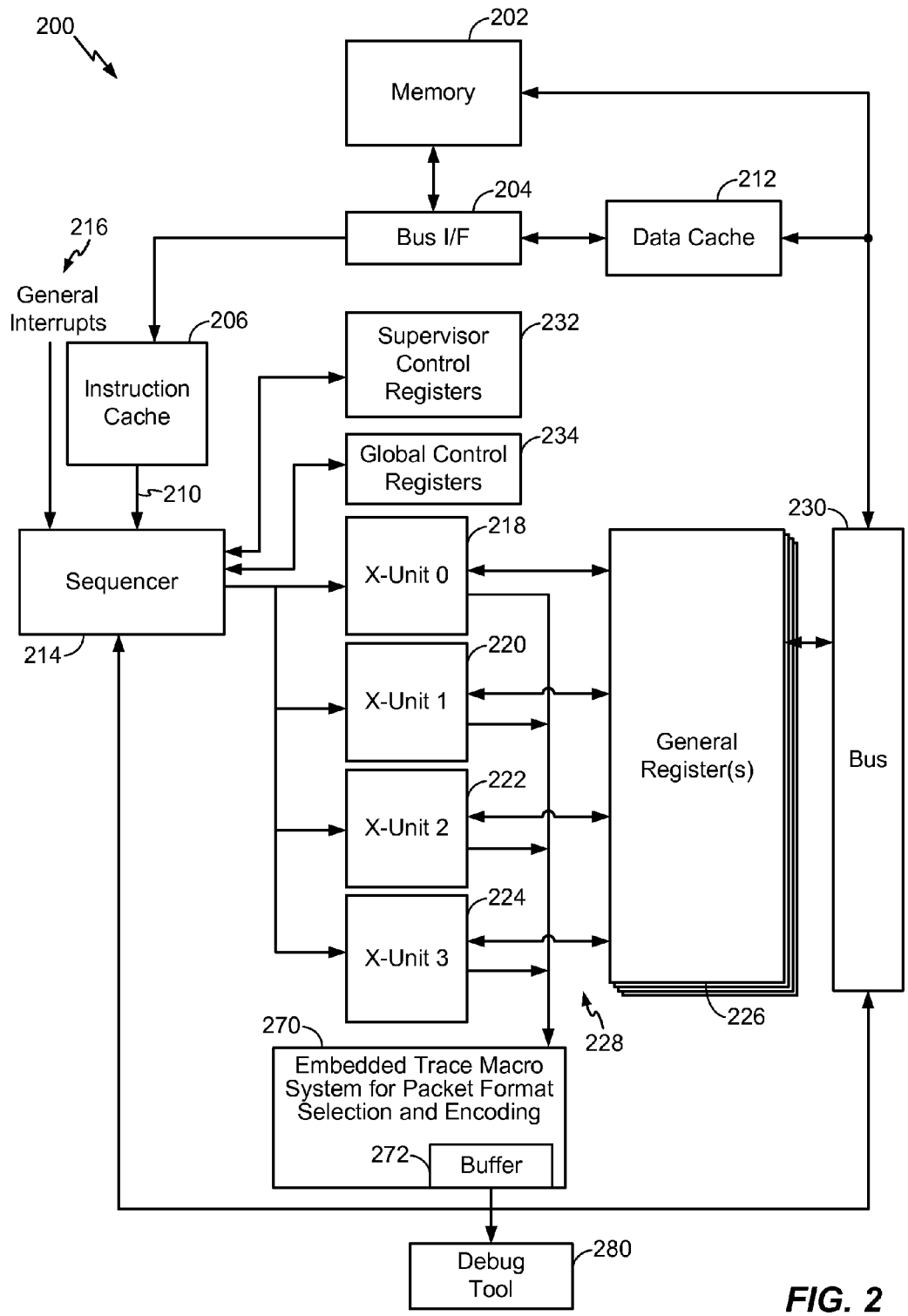
FIG. 2 is a block diagram of a particular illustrative embodiment of a multi-threaded processing system that has an embedded trace macro system configured for capturing information related to dynamically scheduled threads.

FIG. 2 is a block diagram of a particular illustrative embodiment of a multi-threaded processing system 200 that includes an embedded trace macro system 270 configured to perform packet format selection and encoding. The processing system 200 includes a memory 202 that is adapted to communicate with an instruction cache 206 and a data cache 212 via a bus interface 204. The instruction cache 206 is coupled to a sequencer 214 by a bus 210. Additionally, the sequencer 214 is adapted to receive interrupts, such as general interrupts 216, which may be received from an interrupt register. The sequencer 214 is also coupled to supervisor control registers 232 and global control registers 234. In a particular embodiment, the instruction cache 206 is coupled to the sequencer 214 via a plurality of instruction registers, which may be coupled to the bus 210 and associated with particular threads of the processing system 200.

The processing system 200 includes the embedded trace macro system 270 that is configured to perform packet format selection and encoding. In a particular embodiment, the processing system 200 is a dynamically interleaved multi-threaded processor including six hardware threads configured to concurrently support execution of up to six software threads. The hardware threads are executed by different execution units (e.g., a first instruction execution unit 218, a second instruction execution unit 220, a third instruction execution unit 222, and a fourth instruction execution unit 224) that may be used to execute multiple operations in parallel. To control the execution of the software threads, the sequencer 214 is coupled to each of the execution units 218, 220, 222, and 224 and controls the allocation of software threads among the instruction execution units 218, 220, 222, and 224.

Each instruction execution unit 218, 220, 222, and 224 can be coupled to a general register file 226 via a second bus 228. The general register file 226 can also be coupled to the sequencer 214, the data cache 212, and the memory 202 via a third bus 230. The supervisor control registers 232 and the global control registers 234 may store bits that may be accessed by control logic within the sequencer 214 to determine whether to accept interrupts and to control execution of instructions.

The embedded trace macro system 270 includes a memory 272, such as a buffer. In a particular embodiment, the memory 272 corresponds to the FIFO buffer 140 of FIG. 1. The embedded trace macro system 270 may generate and store encoded packets in the memory 272, and the data from the memory 272 may be accessed by an external debug tool 280. Thus, the system 200 is configured to systematically schedule a plurality of processing threads for execution and includes a memory 272 that is configured to store data related to execution of each of the plurality of threads during a particular time period. The data stored in the memory 272 is accessible in connection with a debug operation performed by the debug tool 280. In a particular illustrative embodiment, the data is encoded in a format that is selected based on a number of threads executed during the time period. An illustration of various time periods and data encoded based on particular formats selected based on the number of threads executing during such time periods is described with reference to FIGS. 3-5.

Figure 3:
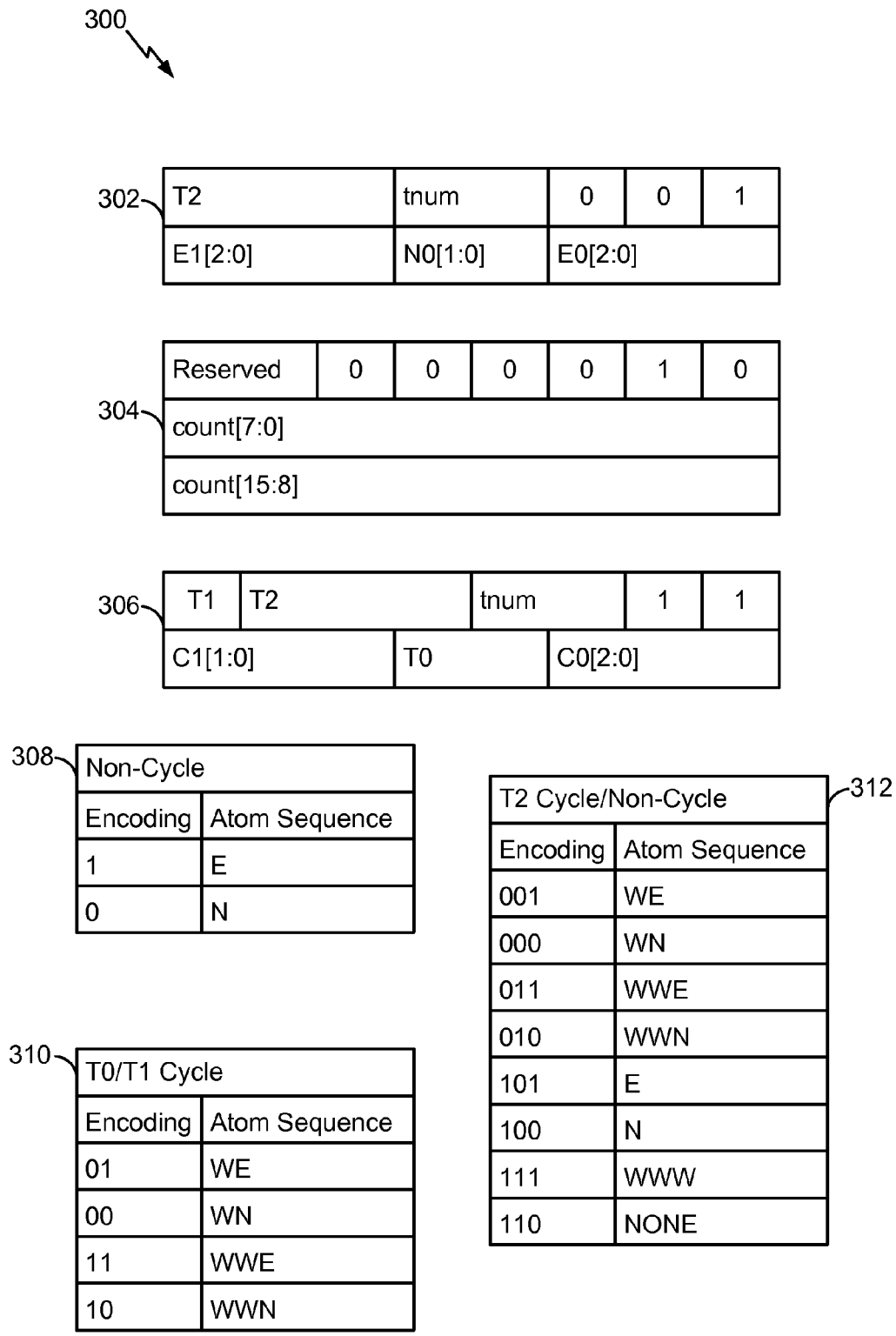
FIG. 3 is a diagram showing examples of packet formats that may be generated by an embedded trace macro system for a multi-threaded processor.

FIG. 3 is a diagram showing example packet formats that may be generated by an embedded trace macro system for a multi-threaded processor and is designated 300. FIG. 3 shows a first packet format 302, a second packet format 304, and a third packet format 306. FIG. 3 also shows a non-cycle accurate encoding chart 308, a first atom sequence designated "T0"/second atom sequence designated "T1" encoding chart 310, and a last atom sequence designated "T2 Cycle/NonCycle" encoding chart 312. The width of the fields in packet formats 302, 304, and 306 of FIG. 3 may vary, but this is for illustration only and should not be taken to represent the exact or relative lengths of the data stored in packet formats 302, 304, and 306.

In one embodiment, the packets contain information that indicates whether an instruction was executed by a thread. If the thread executes an instruction during a processing cycle of the multi-threaded processor, the cycle is considered an execute cycle that may be referred to as an "E" cycle. An "E" cycle may indicate to the debug tool that a program has advanced to the next instruction or jumped to another instruction location (in the case of a jump or conditional branch). If the thread is unable to commit the instruction due to circumstances such as a cache miss or another thread using the processor during the cycle, the cycle is considered to be a wait cycle that may be referred to as a "W" cycle. A "W" cycle may indicate to the debug tool that the thread has not advanced from the instruction that was committed during the previous cycle. A "W" cycle may also indicate to the debug tool that another thread committed during that cycle. If the thread committed a conditional branch instruction, and if the thread does not branch because the condition was not met, then the instruction execution is considered to be a non-execute cycle which may referred to as an "N" cycle. An "N" cycle may indicate to the debug tool, when reconstructing the thread's execution flow, to not take the branch and to instead advance to the next sequential instruction.

The first packet format 302 may be a format that is suitable for use when a single thread is being executed. In a particular embodiment, the first packet format 302 includes a field of three bits set to "0", "0", and "1" to identify the packet as being encoded in the first format, an E0 field, an N0 field, an E1 field, a tnum field, and a T2 field.

The E0 field may include three bits that may indicate the number of consecutive "E" cycles performed by a single thread at the beginning of the time frame covered by the packet. The N0 field may include two bits that may indicate the number of consecutive "N" cycles performed by a single thread. The "N" cycles may occur after the "E" cycles indicated by the E0 field or may occur at the beginning of the time frame covered by the packet. The E1 field may include three bits that may indicate the number of consecutive "E" cycles performed by a single thread. The "E" cycles may occur after the "N" cycles indicated by the N0 field or may occur after the "E" cycles indicated by the E0 field if the E0 field reaches a maximum value. The tnum field may include two bits that may indicate which thread the packet was generated for. The T2 field may include three bits that may indicate the last atom sequence taken by the thread. In some embodiments, the T2 field may encode an atom sequence of "E" when the E1 field has reached a maximum value and the thread has another "E" cycle that is not encoded in the E1 field. In some embodiments, the T2 field may encode an atom sequence of "N" when the N0 field has reached a maximum value and the thread has another "N" cycle that is not encoded in the N0 field. The encoding of the atom sequences for T2 is discussed herein with reference to T2 encoding chart 312.

The second packet format 304 may be referred to as a cycle count packet. The second packet format 304 may include a cycle count field and a field identifying the packet as being encoded in the second format. The cycle count field may be used to identify a thread that is not executing and may indicate a number of cycles since the last packet was received by a debug tool, such as the debug tool 180 in FIG. 1. In some embodiments, a packet of the second packet format 304 may be generated along with another packet of either the first packet format 302 or the third packet format 306 because the second packet format 304 may not have a field identifying which thread the packet corresponds to (e.g., the second packet format 304 does not include a tnum field). In some embodiments, if the cycle count field reaches a maximum capacity then a packet format selector and encoder module may generate a packet of the first packet format 302 containing 0 in the E0 field, 0 in the N0 field, 0 in the field E1 and "110" (corresponding to "NONE") in the T2 field, so that a packet having the second packet format 304 may be sent with another packet having a tnum field.

The third packet format 306 may be a format suitable for use when multiple threads execute during a particular time period (e.g., a "WWN" atom sequence may indicate that multiple threads executed during a time period). For example, the third packet format 306 may include a field of two bits set to "1" and "1" to identify the packet as being encoded in the third format, a tnum field, a T0 field, a C0 field, a T1 field, a C1 field, and a T2 field, as shown in FIG. 3.

The tnum field may include two bits that indicate which thread the packet was generated for. The T0 field may include two bits that indicate the first atom sequence generated by the thread during the time frame that the packet represents. The encoding of the atom sequences for T0 is further described herein with reference to the T0/T1 encoding chart 310. The C0 field may include three bits that indicate the number of times that the atom sequence stored in T0 repeats. The T1 field may include two bits that may indicate the second atom sequence taken by the thread during the time frame that the packet represents. The encoding of the atom sequences for T1 is further described herein with reference to the T0/T1 encoding chart 310. In some embodiments, the same atom sequence may be encoded in the T0 and T1 fields when the C0 field reaches a maximum value and the thread has another T0 atom sequence that is not encoded in the C0 field. The C1 field may include two bits that may indicate the number of times that the atom sequence stored in T1 repeats. The T2 field may include three bits that may indicate the last atom sequence taken by the thread. In some embodiments, the same atom sequence may be encoded in T1 and T2 when the C1 field reaches a maximum value and the thread has another T1 atom sequence that is not encoded in the C1 field. The encoding of the atom sequences for T2 is further described herein with reference to the T2 encoding chart 312.

The non-cycle accurate encoding chart 308 shows an encoding scheme for "E" cycles and "N" cycles. A bit value of 1 indicates that the thread executed the instructions, i.e., an "E" cycle. A bit value of 0 indicates that the thread did not execute the instructions, such as not taking a conditional branch, i.e., an "N" cycle. The encoding scheme may be used by a debug tool, such as the debug tool 280 in FIG. 2, to identify a specific action taken by a thread.

The T0/T1 encoding chart 310 shows an encoding scheme that may be used in the third packet format 306 in the T0 and T1 fields. The atom sequences all indicate that the thread had at least one "W" cycle before having either an "E" or "N" cycle. A value of "01" indicates that the thread waited one cycle before having an "E" cycle. A value of "00" indicates that that the thread waited one cycle before having an "N" cycle. A value of "11" indicates that a thread waited two cycles before having an "E" cycle. A value of "10" indicates that the thread waited two cycles before having an "N" cycle.

The T2 encoding chart 312 shows an encoding scheme that may be used in the first or third packet formats 302, 306 in the T2 field. The T2 encoding chart 312 may in some embodiments be used for cycle accurate as well as non-cycle accurate encodings. If the first bit of the field is a 0, then the atom sequences may be the same as in T0/T1 encoding chart 310 for the last two bits. If the first bit is a 1, then the encoded value may correspond to additional atom sequences not present in the T0/T1 encoding chart 310. A value of "101" may indicate that the thread had an "E" cycle immediately after the previous action indicated by the packet. A value of "100" may indicate that the thread had an "N" cycle immediately after the previous action indicated by the packet. A value of "111" may indicate that the thread had three waits after the last action indicated by the packet. A value of "110" may indicate a "NONE" cycle occurred. A "NONE" cycle may indicate that no additional actions occurred after the last one encoded in the packet. For example, the packet being sent may be an empty packet being sent along with a packet encoded in the second packet format 304. Alternatively, the thread may have completed running and a packet is being generated to signify this. As another example, the debugger may have requested a packet when there was nothing to be encoded in the T2 field.

Figure 4:
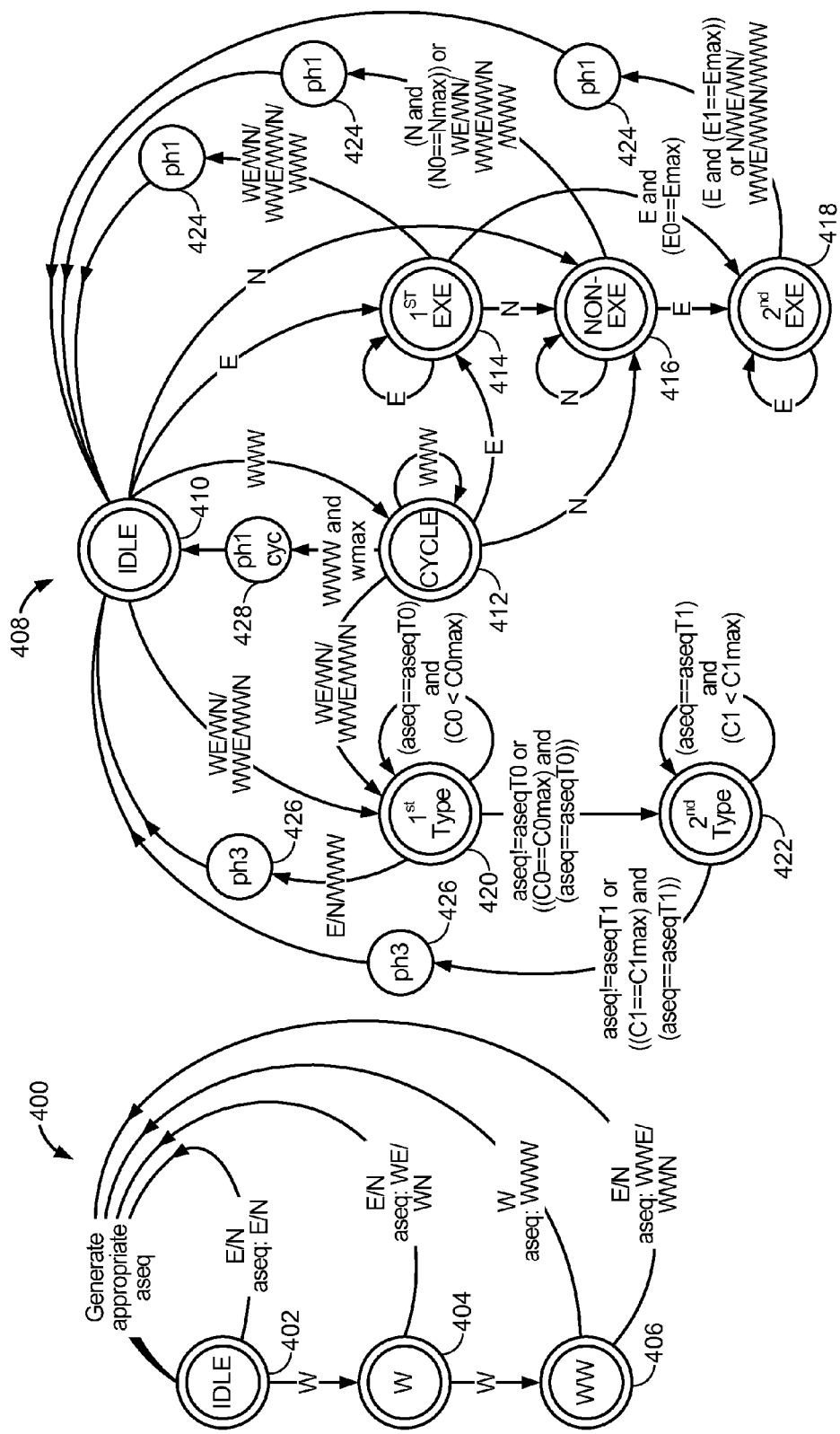
FIG. 4 is a diagram of a particular illustrative embodiment of one state machine configured to generate atoms and a particular illustrative embodiment of one state machine configured to generate packets.

FIG. 4 is a particular illustrative embodiment of a first state machine 400 configured to generate atom sequences and a second state machine 408 configured to generate packets. The state machines 400 and 408 include a plurality of states and include a plurality of transition events between the plurality of states. In a particular illustrative embodiment, the plurality of states shown in FIG. 4 includes idle states 402 and 410. The plurality of states further includes "W" state 404 and "WW" state 406. The plurality of states further includes a cycle state 412 that may generate a packet with a first format ("ph1") in conjunction with a packet having a second format ("cyc") as shown at 428. In an illustrative embodiment, the first format may be the first packet format 302 and the second format may be the second packet format 304 of FIG. 3. The plurality of states further includes states 420 and 422 that may generate a packet having a third format ("ph3") as shown at 426. In an illustrative example, the third format may be the third packet format 306 of FIG. 3. The plurality of states also includes other transitory states including states 414, 416, and 418 that may generate a packet having the first format ("ph1") as shown at 424.

During operation, each thread in a processor may be in one of the states 402, 404, and 406 of the first state machine 400 and one of the states 410, 412, 414, 416, 418, 420, and 422 of the second state machine 408. The combination of the two state machines 400 and 408 may indicate what type of packets and what atom sequences are generated for the thread. The atom sequences generated by the first state machine 400 may be used as transition events in the second state machine 408.

As shown in FIG. 4, the first state machine 400 may generate an atom sequence (aseq) in response to the behavior of a thread. In an illustrative example, the atom sequence may be encoded using the encoding charts 308, 310, 312, or any combination thereof of FIG. 3. For example, if the first state machine 400 is in the idle state 402 when a cycle occurs for a thread corresponding to the first state machine 400, then three possible transitions may occur. If the corresponding thread has an "E" cycle, then the first state machine 400 may generate an "E" atom sequence and remain in the idle state 402. If the corresponding thread has an "N" cycle, then the first state machine 400 may generate an "N" atom sequence and remain in the idle state 402. If the corresponding thread has a "W" cycle, then the first state machine 400 may transition into the "W" state 404 without generating an atom sequence.

Continuing to the "W" state 404, if the state machine is in the "W" state 404 when a cycle occurs for a thread corresponding to the first state machine 400, then three possible transitions may occur. If the corresponding thread has an "E" cycle, then the first state machine 400 may generate a "WE" atom sequence and transition to the idle state 402. If the corresponding thread has an "N" cycle, then the first state machine 400 may generate a "WN" atom sequence and transition to the idle state 402. If the corresponding thread has a "W" cycle, then the first state machine 400 may transition to the "WW" state 406 without generating an atom sequence.

Continuing to the "WW" state 406, if the first state machine 400 is in the "WW" state 406 when a cycle occurs for a thread corresponding to the first state machine 400, then three possible transitions may occur. If the corresponding thread has an "E" cycle, then the first state machine 400 may generate a "WWE" atom sequence and transition to the idle state 402. If the corresponding thread has an "N" cycle, then the first state machine 400 may generate a "WWN" atom sequence and transition to the idle state 402. If the corresponding thread has a "W" cycle, then the first state machine 400 may generate a "WWW" atom sequence and transition to the idle state 402.

A packet format of a packet generated for a thread may be determined by the second state machine 408. Atom sequences may include "E," "N," "WE," "WN," "WWE," "WWN," and "WWW". The first packet format 302 may be selected if only one thread commits during a time period, which may be indicated by an atom sequence of an "E" or an "N." The first packet format 302 may also be selected if a non-cycle accurate mode is enabled. The second packet format 304 may be selected if no thread commits in a time period for the thread, which may be indicated by an atom sequence of "WWW." The second packet format 304 may also be selected if more than one thread commits in a time period and the number of commit operations performed by other threads in the time period is greater than or equal to a threshold. The threshold may be equal to the number of threads of the processor (e.g., three threads as an example). The second packet format 304 may also be selected if a combination of commit operations by other threads and cycles where no commit operations occurs in a time period that is greater than a threshold (e.g., three). The third packet format 306 may be selected if more than one thread commits during a time period, which may be indicated by an atom sequence of "WE," "WN," "WWE," or "WWN." The third packet format 306 may also be selected if a number of stall cycles by a particular thread is one or greater but is less than the threshold (e.g., three). The atom sequences of "WE," "WN," "WWE," and "WWN" may also indicate that the number of stall cycles by the particular thread is one or greater and is less than the threshold. The third packet format 306 may be selected based on one of the atom sequences "WE," "WN," "WWE," and "WWN" being the atom sequence of the time period. Thus, a packet format (e.g., any of the packet formats 302, 304, or 306) may be selected based on a number of threads executed during a particular time period.

A packet may be generated and stored in a buffer, such as the FIFO buffer 140 of FIG. 1, when the packet is unable to store any more information (e.g., when the packet is full). A packet having the first packet format 302 may contain a count of consecutive "E" cycles, a count of consecutive "N" cycles, and a final atom sequence. A packet having the second packet format 304 may contain a count of consecutive "WWW" cycles. A packet having the second packet format 304 may be generated along with another packet. A packet having the third packet format 306 may contain a first encoded atom sequence selected from "WE," "WN," "WWE," and "WWN," a count of the number of consecutive occurrences of the atom sequence, a second atom sequence selected from "WE," "WN," "WWE," and "WWN," a count of the number of consecutive occurrences of the second atom sequence, and a final atom sequence.

As shown in FIG. 4, transition events, such as an atom sequence generated by the first state machine 400, may trigger a change in states between a first state and a second state of the second state machine 408. For example, when the second state machine 408 originates in the idle state 410, an atom sequence of "WWW" triggers a transition from the idle state 410 to the cycle state 412. An atom sequence of "E" may trigger a transition from the idle state 410 to a first execute state 414 and an atom sequence of "N" may trigger a transition to a non-execute state 416. An atom sequence of "WE," "WN," "WWE," or "WWN" may trigger a transition from the idle state 410 to the first type state 420.

A transition into the cycle state 412 may indicate that a packet with a second packet format, such as the second packet format 304 of FIG. 3, may be generated in addition to a next packet with the first or third format as shown at 424 or 426. An atom sequence of "E" may trigger a transition from the cycle state 412 to the first execute state 414, and an atom sequence of "N" may trigger a transition from the cycle state 412 to the non-execute state 416. An atom sequence of "WE," "WN," "WWE," or "WWN" may trigger a transition from the cycle state 412 to the first type state 420. An atom sequence of "WWW" may trigger the second state machine 408 to remain in cycle state 412 and increment a count of consecutive wait cycles, such as the count field in the second packet format 304 of FIG. 3. If the number of "WWW" atom sequences exceeds a threshold (e.g., the maximum number of wait states that can be stored in a packet, such as a packet having the second packet format 304), the packet generation logic of the second state machine 408 may generate a packet having the first format and a packet having the second format, as shown at 428. In addition, after generating such packets, the second state machine 408 may transition from the cycle state 412 back to the idle state 410. Various other transitions involving actions, triggers, and packet generation of different packet formats are shown.

As a further example, the plurality of transition states 414, 416, 418 are used to generate packets having the first format, such as the first packet format 302 of FIG. 3 as shown at 424, and are shown as triggering events that return processing back to the idle state 410.

A transition into the first execute state 414 may cause a counter in the first packet format, such as the E0 field in first packet format 302, to be incremented. At the first execute state 414, an atom sequence of "E" may cause the second state machine 408 to remain in the first execute state 414. If the number of "E" cycles exceeds a threshold (e.g., the maximum value of the E0 field in the first packet format 302), the second state machine 408 may transition from the first execute state 414 to the second execute state 418. For example, at the first execute state 414, the number of "E" cycles may exceed the threshold when E0 is at a maximum value (e.g., emax) and an atom sequence of "E" is received. An atom sequence of "N" may trigger a transition from the first execute state 414 to the non-execute state 416. If an atom sequence of "WE," "WN," "WWE," "WWN," or "WWW" is received, the packet generation logic of the second state machine 408 may generate a packet having the first format, as shown at 424, and encode the triggering event into the generated packet, such as into the T2 field of the first packet format 302. In addition, after generating such packets, the second state machine 408 may transition from the first execute state 414 back to the idle state 410.

A transition into the non-execute state 416 may cause a counter in the first format, such as the N0 field in first packet format 302, to be incremented. While at the non-execute state 416, an atom sequence of "N" may cause the second state machine 408 to remain in the non-execute state 416. If the number of "N" cycles exceeds a threshold (e.g., the maximum value of the N0 field in the first packet format 302), the packet generation logic of the second state machine 408 may generate a packet having the first format, as shown at 424, and encode the triggering "N" into the generated packet, such as into the T2 field of the first packet format 302. For example, at the non-execute state 416, the number of "N" cycles may exceed a threshold when N0 is at a maximum value (e.g., nmax) and an atom sequence of "N" is received. In addition, after generating such a packet, the second state machine 408 may transition from the non-execute state 416 back to the idle state 410. An atom sequence of "E" may trigger a transition from the non-execute state 416 to the second execute state 418. If an atom sequence of "WE," "WN," "WWE," "WWN," or "WWW" is received, the packet generation logic of the second state machine 408 may generate a packet having the first format, as shown at 424, and encode the triggering event into the generated packet, such as into the T2 field of the first packet format 302. In addition, after generating such a packet, the second state machine 408 may transition from the non-execute state 416 back to the idle state 410.

A transition into the second execute state 418 may cause a counter in the first format, such as the E1 field in first packet format 302, to be incremented. While at the second execute state 418, an atom sequence of "E" may cause the second state machine 408 to remain in the second execute state 418. If the number of "E" cycles exceed a threshold (e.g., the maximum value of the E1 field in the first packet format 302) the packet generation logic of the state machine may generate a packet having the first format, as shown at 424, and encode the triggering "E" into the generated packet, such as into the T2 field of the first packet format 302. For example, at the second execute state 418, the number of "E" cycles may exceed the threshold when E1 is at a maximum value (e.g., emax) and an atom sequence of "E" is received. In addition, after generating such a packet, the second state machine 408 may transition from the second execute state 418 back to the idle state 410. If an atom sequence of "N," "WE," "WN," "WWE," "WWN," or "WWW" is received, the packet generation logic of the second state machine 408 may generate a packet having the first format, as shown at 424, and encode the triggering event into the generated packet, such as into the T2 field of the first packet format 302. In addition, after generating such a packet, the second state machine 408 may transition from the second execute state 418 back to the idle state 410.

As a further example, the plurality of transition states 420 and 422 are used to generate packets having the third format, such as the third packet format 306 of FIG. 3 as shown at 426, and are shown as triggering events that return processing back to the idle state 410.

A transition into the first type state 420 may cause a counter in the third packet format, such as the C0 field in third packet format 306 of FIG. 3, to be incremented. The transition may also cause the module or logic represented by the second state machine 408, such as packet format selector and encoder module 132, to store the atom sequence that triggered the transition into the first type state 420 as aseqT0 or in a field in the third format, such as the T0 field in the third packet format 306. An atom sequence that is the same as the atom sequence stored in aseqT0 may cause the second state machine 408 to remain in the first type state 420. If the same atom sequence as the atom sequence stored in aseqT0 is repeated more than a threshold number of times (e.g., more than the maximum value of the C0 field in the third packet format 306), the second state machine 408 may transition into the second type state 422. For example at the first type state 420, the atom sequence stored in aseqT0 may be repeated more than a threshold number of times when C0 is at a maximum value (e.g., C0 max) and an atom sequence received is the same as the atom sequence stored in aseqT0. If an atom sequence of "N," "E," or "WWW" is received, the packet generation logic of the second state machine 408 may generate a packet having the third format, as shown at 426, and encode the triggering event into the generated packet such as into the T2 field of the third packet format 306. In addition, after generating such a packet, the second state machine 408 may transition from the first type state 420 back to the idle state 410. An atom sequence of "WE," "WN," "WWE," or "WWN," unless it is the atom sequence stored in aseqT0, may trigger a transition from the first type state 410 to the second type state 422.

A transition into the second type state 422 may cause a counter in the third packet format, such as the C1 field in the third packet format 306 of FIG. 3, to be incremented. The transition may also cause the module or logic represented by the second state machine 408, such as the packet format selector and encoder module 132, to store the atom sequence which triggered the transition into the second type state 422 as aseqT1 or in a field in the third format such as the T1 field in the third packet format 306. An atom sequence that is the same as the atom sequence stored in aseqT1 may trigger the second state machine 408 to remain in the second type state 422. If the same atom sequence as the atom sequence stored in aseqT1 is repeated more than a threshold number of times (e.g., more than the maximum value of the C1 field in the third packet format 306), the packet generation logic of the second state machine 408 may generate a packet having the third format, as shown at 426, and encode the triggering event into the generated packet such as into the T2 field of the third packet format 306. For example, at the second type state 422, the atom sequence stored in aseqT1 may be repeated more than a threshold number of times when C1 is at a maximum value (e.g., C1 max) and a received atom sequence is the same as the atom sequence stored in aseqT1. In addition, after generating such packets, the second state machine may transition from the second type state 422 back to the idle state 410. If any atom sequence, unless it is the atom sequence stored in aseqT1, is received the packet generation logic of the second state machine 408 may generate a packet having the third format, as shown at 426, and encode the triggering event into the generated packet such as into the T2 field of the third packet format 306. In addition, after generating such packets, the second state machine 408 may transition from the second type state 422 back to the idle state 410.

The state machines 400 and 408 illustrate a particular implementation of an encoding method for generation of encoded packets having a selected packet type in accordance with various actions that may be performed by multiple threads of a dynamic multi-threaded architecture processor. The state machines 400 and 408 illustrate operation. While the state machines 400 and 408 have been shown in FIG. 4 as an illustrative implementation of a method of packet generation for use in an embedded trace macro unit, it should be understood that alternative implementations, such as hard coded logic or programmed logic (e.g., instructions executable by a processor) may be implemented in order to perform packet generation in accordance with various packet formats as described herein. In a particular embodiment, the state machines 400 and 408 may be implemented within the packet format selector and encoder module 132 of FIG. 1 or within the embedded trace macro system 270 of FIG. 2. In another embodiment, the state machines 400 and 408 may be implemented within a wireless communication device as further described with reference to FIG. 7.

Figure 5:
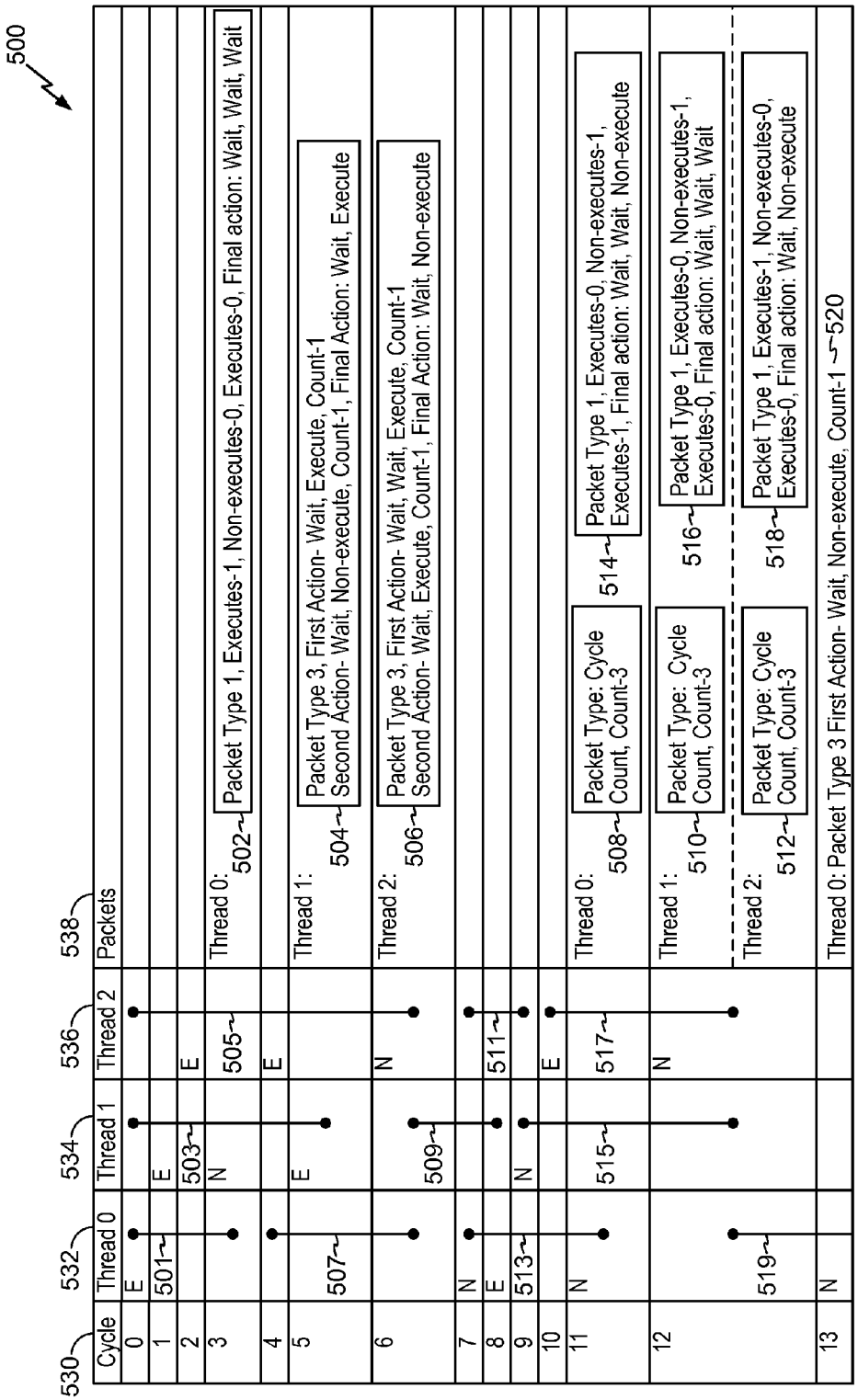
FIG. 5 is a sample trace by a processor having three hardware threads.

FIG. 5 is a sample trace 500 of a processor with three hardware threads and illustrates the packets that may be generated based on execution of a particular illustrative sequence of instructions. The sample trace 500 uses the three encoding formats 302, 304, 306 of FIG. 3 and follows the state machines 400 and 408 of FIG. 4. The sample trace 500 illustrates a number of cycles 530, a first thread 532, a second thread 534, and a third thread 536. The sample trace 500 also illustrates packets 538 generated at various cycle times in response to activities performed by each of the threads 532-536. While the sample trace 500 shows execution of three threads, it should be understood that the method and system described herein may be applicable to less than three threads or more than three threads depending on the particular design architecture. The height of the rows and the size of packets in sample trace 500 may vary, but this should not be taken to represent a difference in length of cycles, number of executions, amount of data, or any combination thereof.

During operation of a processor, such as a dynamic interleaved multi-threaded processor, the processor may execute instructions during various cycles. Illustrated cycles 530 are shown.

The thread columns 532-536 indicate whether a given thread has an "E" cycle, an "N" cycle, or a "W" cycle. Any cycle that is not an "E" cycle or an "N" cycle is considered to be a "W" cycle. The lines in the thread columns 532-536 indicate the time frames that correspond to packets that are generated by the thread and stored in memory for debugging purposes, as further described below. The packets column indicates the packets generated and the data contained in the packets.

In cycle 0, thread 0 is an active thread and has (e.g., experiences, undergoes, or acts in accordance with) an "E" cycle. Threads 1 and 2 both have "W" cycles during cycle 0. Each of the time frames 501, 503, and 505 begin at cycle 0. A single thread executes during a time period that corresponds to cycle 0, which is indicated by the first atom sequence of thread 0 being an "E." Because a single thread (thread 0) executed during the time period (cycle 0), the packet to be generated for thread 0 is determined to have the first packet format 302. No packet format is determined at cycle 0 for threads 1 or 2.

In cycle 1, thread 1 has an "E" cycle. Thread 1 has a first atom sequence of "WE." The first atom sequence of thread 1 indicates that at least two threads executed during a time period that corresponds to cycles 0 to 1. Since at least two threads were executing for the time period that corresponds to cycles 0 to 1, the packet to be generated by thread 1 is determined to have the third packet format 306. Thread 0 has a "W" cycle so thread 0 stops counting "E" cycles and begins to determine the atom sequence of the last instruction to be stored in the packet. No packet format is selected for thread 2 because the atom sequence of thread 2 is not complete.

In cycle 2, thread 2 has an "E" cycle. Thread 2 has a first atom sequence of "WWE." The first atom sequence of thread 2 indicates that at least two threads committed during a time period that corresponds to cycles 0 to 2. Since at least two threads were executed for the time period that corresponds to cycles 0 to 2, the packet to be generated by thread 2 is determined to have the third packet format 306. Thread 0 has a "W" cycle again. No packet format is selected for thread 0 because the atom sequence of thread 0 is not complete. Thread 1 has a "W" cycle which is not enough information to make any additional encodings.

In cycle 3, thread 0 generates a packet 502 corresponding to the time frame 501. Because thread 0 had an "E" cycle at the beginning of the time frame 501 indicating that one thread was executed during a time period that corresponds to cycle 0, the packet 502 has the first packet format 302. As illustrated, the packet 502 indicates that the time frame 501 includes one "E" cycle (Executes-1) followed by three wait cycles (Wait, Wait, Wait). The generated packet 502 is stored in memory (e.g., the ETB 150). Thread 1 has an "N" cycle. "WN" becomes the second atom sequence for thread 1's packet since the newly generated atom sequence is different from the previously generated atom sequence of "WE." Thread 2 has a "W" cycle which is not enough information to make any additional encodings.

In cycle 4, thread 2 has an "E" cycle. "WE" becomes the second atom sequence for thread 2's packet since the newly generated atom sequence is different from the previously generated atom sequence of "WWE." Thread 0 begins a time frame 507 with a "W" cycle which is not enough information to determine the packet type. Thread 1 has a "W" cycle which is not enough information to make any additional encodings.

In cycle 5, thread 1 generates a packet 504 corresponding to the time frame 503 because thread 1 completes the atom sequence "WE." Because thread 1 had a "WE" atom sequence at the beginning of the time frame 503, indicating that at least two threads were executing during a time period that corresponds to cycles 0 to 1, the packet 504 has the third packet format 306. As illustrated, the packet 504 indicates the time frame 503 includes a "W" cycle and an "E" cycle (First Action—Wait, Execute) followed by a "W" cycle and an "N" cycle (Second Action—Wait, Non-execute) followed by a "W" cycle and an "E" cycle (Final Action: Wait, Execute). The generated packet 504 is stored in memory (e.g., the ETB 150). No packet format is selected for thread 0 because the atom sequence of thread 0 is not complete. Thread 2 has a "W" cycle which is not enough information to make any additional encodings.

In cycle 6, thread 2 generates a packet 506 corresponding to the time frame 505 because thread 2 completes the atom sequence "WN." Because thread 2 had a "WWE" atom sequence at the beginning of the time frame 505, indicating that at least two threads were executed during a time period that corresponds to cycles 0 to 2, the packet 506 has the third packet format 306. As illustrated, the packet 506 indicates the time frame 505 includes two "W" cycles and an "E" cycle (First Action—Wait, Wait, Execute) followed by a "W" cycle and an "E" cycle (Second Action—Wait, Execute) followed by a "W" cycle and an "N" cycle (Final Action: Wait, Non-execute). The generated packet 506 is stored in memory (e.g., the ETB 150). Thread 0 completes an atom sequence of "WWW" indicating thread 0 was not executing for a time period that corresponds to cycles 4 to 6. The processor determines that no thread executed for the time period that corresponds to cycles 4 to 6. As such, the packet to be generated by thread 0 is determined to have the second packet format 304. Thread 1 begins time frame 509 with a "W" cycle which is not enough information to determine the packet type.

In cycle 7, thread 0 has an "N" cycle. Since a "WWW" atom sequence was generated the last cycle, the atom sequence generated is an "N" which indicates that a single thread is executed during a time period that corresponds to cycle 7. Because a single thread executed during the time period, the packet to be generated for thread 0 is determined as having the first packet format 302. No packet format is selected for thread 1 because the atom sequence of thread 1 is not complete. Thread 2 begins a time frame 511 with a "W" cycle which is not enough information to determine the packet type.

In cycle 8, thread 0 has an "E" cycle. The "E" cycle indicates a transition from counting "N" cycles to counting "E" cycles. Thread 1 completes an atom sequence of "WWW" indicating thread 1 was not executed for a time period that corresponds to cycles 6 to 8. The processor determines that no thread executed for the time period that corresponds to cycles 6 to 8. As such, the packet to be generated by thread 1 is determined to have the second packet format 304. No packet format is selected for thread 2 because the atom sequence for thread 2 is not complete.

In cycle 9, thread 1 has an "N" cycle. Since a "WWW" atom sequence was generated the last cycle, the atom sequence generated is an "N" which indicates that a single thread was executed during a time period that corresponds to cycle 9. Because a single thread executed during the time period, the packet to be generated for thread 1 is determined to have the first packet format 302. Thread 0 has a "W" cycle so thread 0 stops counting "E" cycles and begins to determine the atom sequence of the last instruction to be stored in the packet. Thread 2 completes an atom sequence of "WWW" indicating thread 2 was not executed for a time period that corresponds to cycles 7 to 9. As such, the processor determines that no thread executed for the time period that corresponds to cycles 7 to 9. The packet to be generated by thread 2 is determined to have the second packet format 304.

In cycle 10, thread 2 has an "E" cycle. Since a "WWW" atom sequence was generated the last cycle, the atom sequence generated is an "E" which indicates that a single thread was executed during a time period that corresponds to cycle 10. Because a single thread executed during the time period, the packet to be generated for thread 2 is determined as having the first packet format 302. Thread 0 has a "W" cycle again. No packet format is selected for thread 0 because the atom sequence of thread 0 is not complete. Thread 1 has a "W" cycle so thread 1 stops counting "N" cycles and begins to determine the atom sequence of the last instruction to be stored in the packet.

In cycle 11, thread 0 generates a packet 508 corresponding to the time frame 507 and a packet 514 corresponding to the time frame 513. Because thread 0 had three "W" cycles during the time frame 507 indicating thread 0 was not executed for a time period that corresponds to cycles 4 to 6, the packet 508 has the second packet format 304 (i.e. a cycle count packet). As illustrated, the cycle count packet indicates that during the time frame 507 there were three "W" cycles (Count-3). The generated packet 508 is stored in memory (e.g., the ETB 150). Because thread 0 had an "N" cycle at the beginning of the time frame 513 indicating that a single thread was executed during a time period that corresponds to cycle 7, the packet 514 has the first packet format 302. As illustrated, the packet 514 indicates that during the time frame 513 thread 0 had one "N" cycle (Non-executes-1) followed by one "E" cycle (Executes-1) followed by two "W" cycles and an "N" cycle (Final Action: Wait, Wait, Non-execute). The generated packet 510 is stored in memory (e.g., the ETB 150). Thread 1 has a "W" cycle again. No packet format is selected for thread 1 because the atom sequence of thread 1 is not complete.

Thread 2 has a "W" cycle so thread 2 stops counting "N" cycles and begins to determine the atom sequence of the last instruction to be stored in the packet.

In cycle 12, thread 1 generates a packet 510 corresponding to the time frame 509 and a packet 516 corresponding to the time frame 515. Because thread 1 had three "W" cycles during the time frame 509 indicating that thread 1 was not executed for a time period that corresponds to cycles 6 to 8, the packet 510 is a cycle count packet. As illustrated, the cycle count packet indicates that during time frame 509 there were three "W" cycles (Count-3). The generated packet 512 is stored in memory (e.g., the ETB 150). Because thread 1 had an "N" cycle at the beginning of the time frame 515 indicating that a single thread was executing during a time period that corresponds to cycle 9, the packet 516 has the first packet format 302. As illustrated, the packet 516 indicates that during time frame 515 thread 1 had one "N" cycle (Non-executes-1) followed by three "W" cycles (Final Action: Wait, Wait, Wait).

In cycle 12, thread 2 generates a packet 512 corresponding to the time frame 511 and a packet 518 corresponding to the time frame 517. Because thread 2 had three "W" cycles during time frame 511 indicating thread 2 was not executed for a time period that corresponds to cycles 7 to 9, the packet 512 is a cycle count packet. As illustrated, the cycle count packet indicates that during time frame 507 there were three "W" cycles (Count-3). The generated packet 516 is stored in memory (e.g., the ETB 150). Because thread 0 had an "E" cycle at the beginning of the time frame 517 indicating that a single thread was executed during a time period that corresponds to cycle 10, the packet 518 has the first packet format 302. As illustrated, the packet 518 indicates that during the time frame 517, thread 2 had one "E" cycle (Executes-1) followed by one "W" cycle and an "N" cycle (Final Action: Wait, Non-execute). The generated packet 518 is stored in memory (e.g., the ETB 150). Thread 0 begins a time frame 519 with a "W" cycle which is not enough information to determine the packet type.

In cycle 13, thread 0 has an "N" cycle resulting in a "WN" atom sequence indicating that at least two threads were executed during a time period that corresponds to cycles 12 to 13. Since at least two threads were executed for the time period that corresponds to cycles 12 to 13, the packet to be generated by thread 0 is determined to have the third packet format 306. No packet format is determined at cycle 13 for threads 1 or 2. Packet generation completes at cycle 13 resulting in thread 0 generating a packet 520 corresponding to time frame 519 having the third packet format 306.

FIG. 5 illustrates use of packet formats that vary based on the number of executing threads of a processor, and the packet formats may be used to capture the behavior of a processor, such as a dynamic multi-threaded processor.

Figure 6:
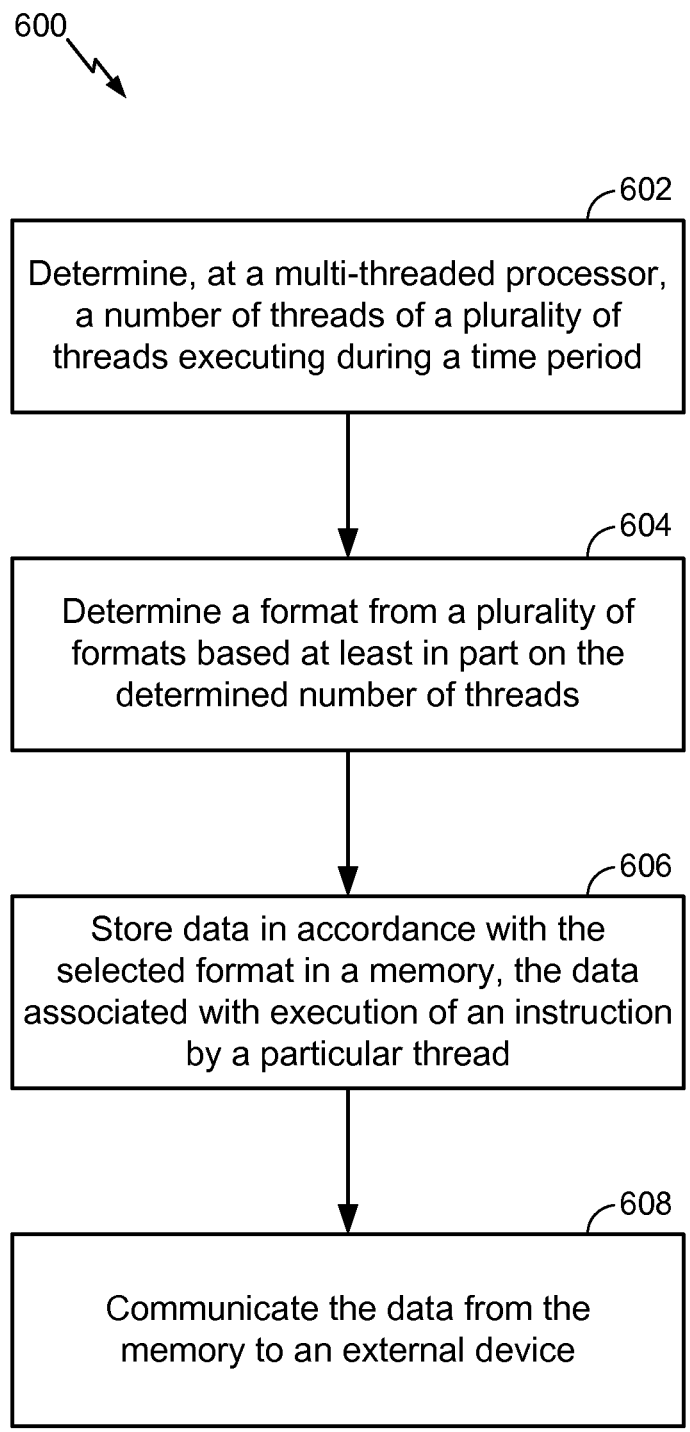
FIG. 6 is a flow diagram of a particular embodiment of a method to select and encode packet formats.

FIG. 6 is a flow diagram of a particular embodiment of a method to select and encode packet formats and is generally designated 600. In an illustrative embodiment, the method 600 is performed by the module 132 of FIG. 1, the embedded trace macro system 270 of FIG. 2, or any combination thereof.

The method 600 may include determining, at a multi-threaded processor, a number of threads of a plurality of threads executing during a time period, at 602. For example, the multi-threaded processor may be the processor 100 of FIG. 1.

Continuing to 604, the method 600 may also include determining a format from a plurality of formats based at least in part on the determined number of threads. For example, determining of the packet format may occur at the embedded trace macro system 270 of FIG. 2. Furthermore, the plurality of formats may include the first packet format 302, the second packet format 304, or the third packet format 306 of FIG. 3.

Continuing to 606, the method 600 may further include storing data in accordance with the selected format in a memory. The data is associated with execution of an instruction by a particular thread. For example, the storing of data may occur at the embedded trace buffer 150 of FIG. 1.

Continuing to 608, the method 600 may include communicating the data from the memory to an external device. For example, the external memory may be the memory 182 of FIG. 1.

FIG. 6 thus illustrates a method 600 that may be used to select packet formats based on the number of executing threads and that may be used to capture the behavior of a processor, such as a multi-threaded processor.

Figure 7:
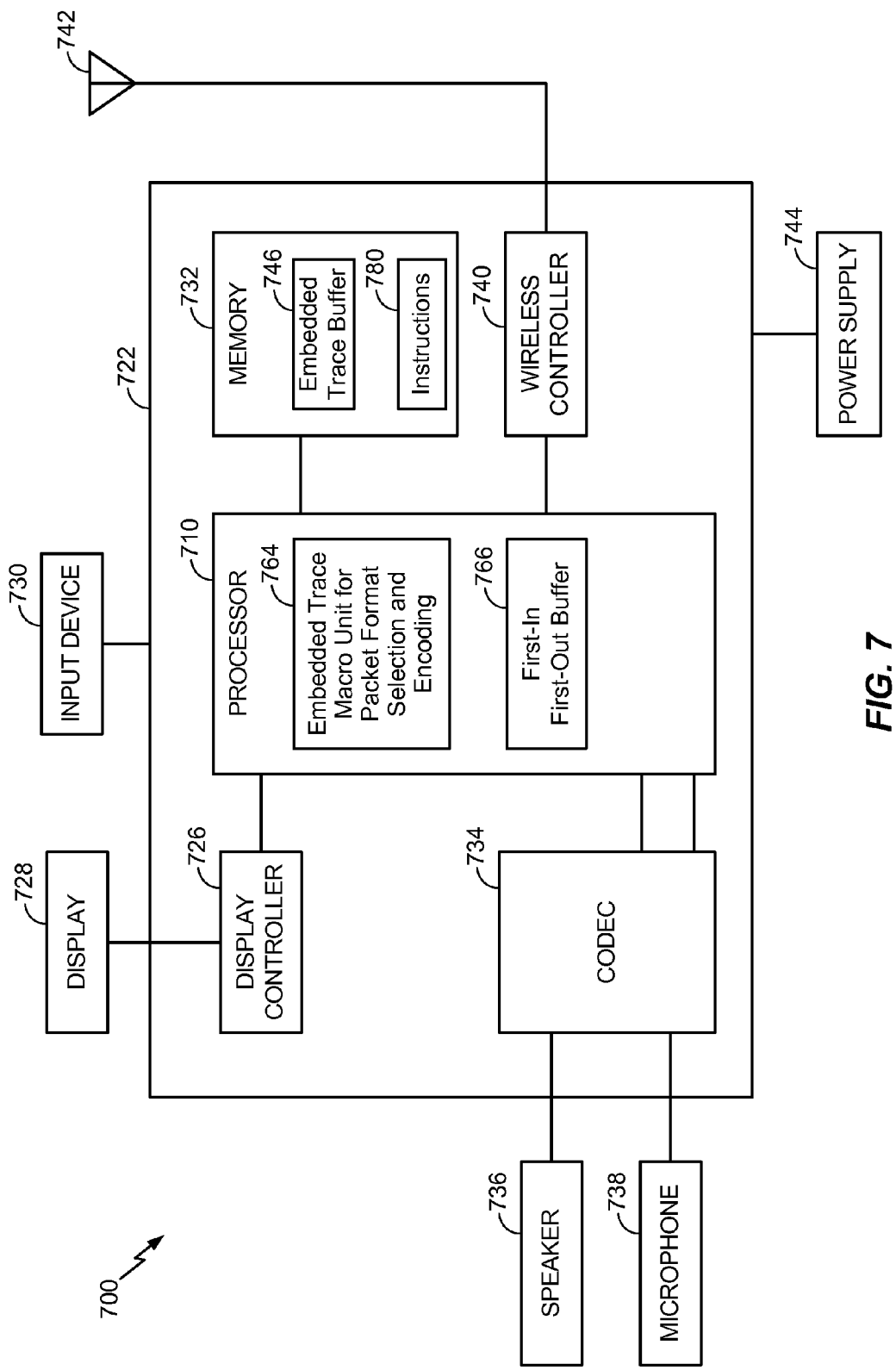
FIG. 7 is a block diagram of a wireless device including a multi-threaded processor that includes an embedded trace macro unit.

FIG. 7 is a block diagram of a particular illustrative embodiment of a communications device 700 that includes a processor 710 having an embedded trace macro unit 764 configured to perform packet format selection and encoding. For example, the embedded trace macro unit 764 may perform packet format selection and encoding. In a particular embodiment, the processor 710 is a multi-threaded processor and may be an interleaved multi-threaded processor or a dynamic multi-threaded processor. The embedded trace macro unit 764 may use a FIFO buffer 766, such as the FIFO buffer 140 of FIG. 1, and an embedded trace buffer 746 that are stored in a memory 732. Contents of the embedded trace buffer 746 may be used to debug software problems. The memory 732 may include instructions 780 corresponding to logic, modules, or any combination thereof, that are executable to perform all or a portion of methods or operations described herein, such as the method 600 of FIG. 6.

The processor 710 may execute multiple hardware threads and the embedded trace macro unit 764 may monitor said execution to generate packets that include debug data. The embedded trace macro unit 764 may select a packet format from a plurality of formats based at least in part on a number of hardware threads determined to be executed by the processor 710. The embedded trace macro unit 764 may send the data encoded in the selected packet formats to the FIFO buffer 766.

FIG. 7 also shows a display controller 726 that is coupled to the processor 710 and to a display 728. Moreover, an input device 730 is coupled to the processor 710. A coder/decoder (CODEC) 734 can also be coupled to the processor 710. A speaker 736 and a microphone 738 can be coupled to the CODEC 734.

FIG. 7 also indicates that a wireless controller 740 can be coupled to the processor 710 and to an antenna 742. In a particular embodiment, the processor 710, the display controller 726, the memory 732, the CODEC 734, and the wireless controller 740 are included in a system-in-package or system-on-chip device 722. In a particular embodiment, the input device 730 and a power supply 744 are coupled to the system-on-chip device 722. Moreover, in a particular embodiment, as illustrated in FIG. 7, the display 728, the input device 730, the speaker 736, the microphone 738, the antenna 742, and the power supply 744 are external to the system-on-chip device 722. However, each of the display 728, the input device 730, the speaker 736, the microphone 738, the wireless antenna 742, and the power supply 744 can be coupled to a component of the system-on-chip device 722, such as an interface or a controller.

In conjunction with one or more of the described embodiments, an apparatus is disclosed that includes means for encoding data related to execution of a plurality of threads. The data is encoded in a format that is based on a number of the plurality of threads executed during a time period. The means for encoding data related to execution of a plurality of threads may include the ETM unit 130 of FIG. 1, the packet format selector and encoder module 132 of FIG. 1, the embedded trace macro system 270 of FIG. 2, the embedded trace macro unit 764 of FIG. 7, one or more other devices or circuits configured to encode data, or any combination thereof.

The apparatus may also include means for storing data encoded by the means for encoding. The stored data is accessible to a debug tool in connection with a debug operation. The means for storing data may include the FIFO buffer 140 of FIG. 1, the ETB 150 of FIG. 1, the memory 272 of FIG. 2, the FIFO buffer 766 of FIG. 7, the ETB 746 of FIG. 7, one or more other devices or circuits configured to store data, or any combination thereof.

The apparatus may also include means for scheduling the plurality of threads. The means for scheduling the plurality of threads may include the processor 100 of FIG. 1, the sequencer 214 of FIG. 2, the processor 710 of FIG. 7, one or more other devices or circuits configured to schedule a plurality of threads, or any combination thereof. The means for scheduling the plurality of threads may include the means for encoding.

Although one or more of FIGS. 1-7 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including a processor and a memory.

Those of skill would further appreciate that the various illustrative logical blocks, configurations, modules, circuits, and algorithm steps described in connection with the embodiments disclosed herein may be implemented as electronic hardware, computer software executed by a processor, or a combination thereof. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An illustrative storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   executing instructions at a multi-threaded processor;
   determining, at the multi-threaded processor, a number of a plurality of threads that the multi-threaded processor executes during a time period;
   selecting a packet format from a plurality of packets foiiiiats for a particular thread based at least in part on the number of threads executed during the time period;
   generating a debug data packet having the selected packet format for the particular thread, wherein the debug data packet indicates whether execution of at least one instruction of the particular thread occurred during the time period; and
   storing the debug data packet based on a trigger time associated with the selected packet format.

2. The method of claim 1, further comprising communicating the debug data packet to an external device.

3. The method of claim 1, wherein the debug data packet includes information relating to execution of instructions of multiple threads by the multi-threaded processor.

4. The method of claim 1, wherein the debug data packet includes information relating to execution of instructions of all of the plurality of threads by the processor.

5. The method of claim 1, wherein the debug data packet includes information relating to whether execution of at least one additional instruction of the particular thread occurred during a second time period after the time period.

6. The method of claim 1, wherein the plurality of packet formats includes a particular packet format for use when the time period is one processor cycle and the at least one instruction is executed during the one processor cycle.

7. The method of claim 1, wherein the plurality of packet formats includes a particular packet format for use when the at least one instruction is not executed during a threshold number of processor cycles of the time period.

8. The method of claim 7, wherein the threshold number is equal to the number of threads.

9. The method of claim 1, wherein the plurality of packet formats includes a packet format for use when:
   the time period is greater than one processor cycle and less than or equal to a threshold number of processor cycles, and
   the at least one instruction is not executed during an initial processor cycle of the time period.

10. The method of claim 9, wherein the threshold number is equal to the number of threads.

11. The method of claim 1, wherein, when the at least one instruction is executed during a processor cycle of the time period, the debug data packet comprises encoded data that indicates execution of the at least one instruction during the processor cycle.

12. The method of claim 1, wherein, when the at least one instruction executed during a processor cycle of the time period is a conditional jump instruction and a determination during execution of the at least one instruction is to not jump, the debug data packet comprises encoded data indicating that the conditional jump instruction was not executed during the processor cycle.

13. The method of claim 1, wherein, when the at least one instruction is not executed during a processor cycle of the time period, the debug data packet indicates that the particular thread waited during the processor cycle.

14. The method of claim 1, wherein determining the packet format comprises selecting a first format of the plurality of packet formats in response to determining that the number of threads is one.

15. The method of claim 14, wherein determining the packet format comprises selecting a second format of the plurality of packet formats in response to determining that a number of commit operations performed by threads other than the particular thread prior to the particular thread performing a commit operation is greater than or equal to a threshold, wherein a commit operation corresponds to execution of a particular instruction or a determination to jump during execution of the particular instruction when the particular instruction is a conditional jump instruction.

16. The method of claim 15, wherein determining the packet format comprises selecting a third format of the plurality of packet formats in response to determining that the number of threads is greater than one and that the number of commit operations is less than the threshold.

17. The method of claim 1, wherein the debug data packet is associated with execution of multiple instructions of the particular thread during the time period.

18. An apparatus comprising:
an encoder configured to encode data for a thread related to execution of instructions of a plurality of threads via a multi-threaded processor, wherein the data for the thread is encoded in a debug data packet having a packet format selected from a plurality of packet formats based on a number of the plurality of threads that the multi-threaded processor executes during a time period, and wherein the debug data packet indicates whether execution of at least one instruction of the thread occurred during the time period; and
a memory configured to store the debug data packet for the thread based on a trigger time associated with the selected packet format, wherein the debug data packet for the thread stored by the memory is accessible to a debugger in connection with a debug operation.

19. The apparatus of claim 18, further comprising a processor configured to schedule the plurality of threads, wherein the processor includes the encoder, and wherein the time period comprises at least one processor cycle of the processor.

20. The apparatus of claim 19, wherein the processor is an interleaved processor.

21. The apparatus of claim 19, wherein the processor is a dynamic multi-threaded processor.

22. The apparatus of claim 19, wherein the memory is integrated into the processor, and wherein the memory is an embedded trace buffer.

23. The apparatus of claim 18, wherein the encoder comprises a state machine configured to select the packet format from a plurality of packet formats.

24. The apparatus of claim 23, wherein the plurality of packet format includes a particular packet fonnat that is selected for the data in response to a determination that execution of the at least one instruction of the thread occurs during an initial processor cycle of the time period.

25. The apparatus of claim 23, wherein the plurality of packet formats includes a particular packet format that is selected for the data in response to a determination that the at least one instruction is not executed during the time period.

26. The apparatus of claim 23, wherein the plurality of packet foimats includes a particular packet format that is selected for the data in response to a determination that execution of the at least one instruction occurs during a processor cycle of the time period other than an initial processor cycle of the time period.

27. A non-transitory computer-readable storage medium storing instructions executable by a computer system to:
detennine, at a multi-threaded processor, a number of threads of a plurality of threads that the multi-threaded processor executes during a time period;
select, at the multi-threaded processor, a packet format from a plurality of formats for a particular thread based at least in part on the number of threads executed during the time period;
generating a debug data packet having the selected packet format for the particular thread, wherein the debug data packet indicates whether execution of at least one instruction of the particular thread occurred during the time period; and
store the debug data packet based on a trigger time associated with the selected packet format.

28. The non-transitory computer-readable storage medium of claim 27, wherein the debug data packet includes information relating to execution of instructions of multiple threads by the multi-threaded processor.

29. The non-transitory computer-readable storage medium of claim 27, wherein the debug data packet includes information relating to execution of instructions of all of the plurality of threads by the multi-threaded processor.

30. An apparatus comprising:
means for encoding data for a thread related to execution of instructions of a plurality of threads via a multi-threaded processor, wherein the data for the thread is encoded in a debug data packet having a packet format selected from a plurality of packet formats based on a number of threads that the multi-threaded processor executes during a time period, and wherein the debug data packet indicates whether execution of at least one instruction of the thread occurred during the time period; and
means for storing the debug data packet for the thread based on a trigger time associated with the selected packet format, wherein the debug data packet stored by the means for storing is accessible to a debug tool in connection with a debug operation.

31. The apparatus of claim 30, further comprising means for scheduling the plurality of threads, wherein the means for scheduling includes the means for encoding, and wherein the time period comprises at least one processor cycle of a processor.

* * * * *